US006561218B2

(12) United States Patent
Mudd

(10) Patent No.: US 6,561,218 B2
(45) Date of Patent: *May 13, 2003

(54) SMALL INTERNAL VOLUME FLUID MASS FLOW CONTROL APPARATUS

(75) Inventor: Daniel T. Mudd, St. Charles, MO (US)

(73) Assignee: Fugasity Corporation, Sparks, NV (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 106 days.

(21) Appl. No.: 09/912,043

(22) Filed: Jul. 24, 2001

(65) Prior Publication Data

US 2002/0014206 A1 Feb. 7, 2002

Related U.S. Application Data

(60) Provisional application No. 60/220,558, filed on Jul. 25, 2000.

(51) Int. Cl.[7] .............................. G05D 7/06; F16K 31/10
(52) U.S. Cl. ............................. 137/487.5; 137/487.5; 137/599.13; 251/129.06
(58) Field of Search ................... 137/487.5, 599.01, 137/599.03, 599.13, 625.4; 251/129.06; 438/935

(56) References Cited

U.S. PATENT DOCUMENTS

| 2,666,297 A | 1/1954 | Skousgaard |
| 3,271,994 A | 9/1966 | Fournier et al. |
| 3,335,748 A | 8/1967 | Klemm et al. |
| 3,559,482 A | 2/1971 | Baker et al. |
| 3,570,807 A | 3/1971 | Sturman et al. |
| 3,807,456 A | 4/1974 | Colletti |
| 3,814,541 A | 6/1974 | Dent et al. |

(List continued on next page.)

FOREIGN PATENT DOCUMENTS

| EP | 0468793 A2 | 1/1992 |
| EP | 0689040 A2 | 12/1995 |
| WO | WO 87/00267 | 1/1987 |

OTHER PUBLICATIONS

Sheriff, David, "Mass Flow Controller Features Digital Calibration," Solid State Technology, Feb. 1993, No. 6, pp. 33–35, Tulsa, OK, US.

Drexel, Charles F., "Digital mass flow controllers," Solid State Technology, Jun. 1993, No. 6, pp. 73, 75, Tulsa, OK, US.

MGB 1000 Micro Gas Blender, Trace Analytical, Menlo Park, CA (Undated).

(List continued on next page.)

Primary Examiner—Michael Powell Buiz
Assistant Examiner—Ramesh Krishnamurthy
(74) Attorney, Agent, or Firm—Haynes and Boone, LLP

(57) ABSTRACT

A fluid mass flow control apparatus, particularly useful for controlling low flow rates of fluids used in semiconductor manufacturing processes, comprises a first elongated flow tube connected to an inlet fitting and to a capsule like valve housing and a second elongated tube connected to the inlet fitting and the valve housing and including a flow sensor. The valve housing is connected to a magnetostrictive actuator including an elongated actuator member disposed in a conduit connected to the valve housing and serving as part of the fluid flow path through the apparatus. An electromagnetic coil is disposed about the conduit and the actuator and is responsive to energization to effect controlled elongation of the actuator to control the position of a valve closure member disposed in the valve housing. Adjustments to full-scale flow ranges of the apparatus may be obtained by inserting a tube or wire in the flow sensor tube to act as a flow restrictor.

21 Claims, 3 Drawing Sheets

U.S. PATENT DOCUMENTS

| | | | |
|---|---|---|---|
| 3,841,520 A | | 10/1974 | Bryant et al. |
| 3,910,113 A | | 10/1975 | Brown |
| 4,015,626 A | | 4/1977 | Thordarson |
| 4,096,746 A | | 6/1978 | Wilson et al. |
| 4,118,009 A | | 10/1978 | Chmura |
| 4,203,465 A | | 5/1980 | Rissi |
| 4,253,156 A | | 2/1981 | Lisle et al. |
| 4,275,752 A | | 6/1981 | Collier et al. |
| 4,315,523 A | | 2/1982 | Mahawili et al. |
| 4,327,757 A | | 5/1982 | Weevers |
| 4,406,161 A | | 9/1983 | Locke et al. |
| 4,462,915 A | | 7/1984 | Friedman |
| 4,565,212 A | | 1/1986 | Klein et al. |
| 4,576,043 A | | 3/1986 | Nguyen |
| 4,589,440 A | | 5/1986 | Panet |
| 4,687,020 A | | 8/1987 | Doyle |
| 4,718,443 A | | 1/1988 | Adney et al. |
| 4,741,359 A | | 5/1988 | Siebald |
| 4,796,651 A | | 1/1989 | Ginn et al. |
| 4,858,643 A | | 8/1989 | Vavra et al. |
| 4,888,117 A | | 12/1989 | Brown et al. |
| 4,904,285 A | | 2/1990 | Yamada et al. |
| 4,918,995 A | | 4/1990 | Pearman et al. |
| 5,003,810 A | | 4/1991 | Jepson et al. |
| 5,052,363 A | | 10/1991 | Stiles |
| 5,062,446 A | | 11/1991 | Anderson |
| 5,080,131 A | * | 1/1992 | Ono et al. ................... 137/486 |
| 5,100,100 A | | 3/1992 | Benson et al. |
| 5,100,551 A | | 3/1992 | Pall et al. |
| 5,114,447 A | | 5/1992 | Davis |
| 5,123,439 A | | 6/1992 | Powers |
| 5,129,418 A | | 7/1992 | Shimomura et al. |
| 5,142,483 A | | 8/1992 | Basham et al. |
| 5,159,951 A | | 11/1992 | Ono et al. |
| 5,161,576 A | | 11/1992 | Hekkert et al. |
| 5,187,972 A | | 2/1993 | DeFriez |
| 5,190,068 A | | 3/1993 | Philibin |
| 5,280,773 A | * | 1/1994 | Henkel .................. 251/129.06 |
| 5,285,673 A | | 2/1994 | Drexel et al. |
| 5,297,427 A | | 3/1994 | Shambayati |
| 5,311,762 A | | 5/1994 | Drexel |
| 5,325,705 A | | 7/1994 | Tom |
| 5,329,966 A | | 7/1994 | Fenimore et al. |
| 5,359,878 A | | 11/1994 | Mudd |
| 5,419,133 A | | 5/1995 | Schneider |
| 5,445,035 A | | 8/1995 | Delajoud |
| 5,487,771 A | | 1/1996 | Zeller |
| 5,511,585 A | | 4/1996 | Lee, II |
| 5,542,284 A | | 8/1996 | Layzell et al. |
| 5,549,272 A | | 8/1996 | Kautz |
| 5,583,282 A | | 12/1996 | Tom |
| 5,624,409 A | | 4/1997 | Seale |
| 5,660,207 A | * | 8/1997 | Mudd ..................... 137/599.13 |
| 5,730,181 A | | 3/1998 | Doyle et al. |
| 5,804,717 A | | 9/1998 | Lucas |
| 5,816,285 A | | 10/1998 | Ohmi et al. |
| 5,865,205 A | | 2/1999 | Wilmer |
| 5,868,159 A | | 2/1999 | Loan et al. |
| 5,904,170 A | | 5/1999 | Harvey et al. |
| 5,911,238 A | * | 6/1999 | Bump et al. .............. 137/487.5 |
| 5,917,066 A | | 6/1999 | Eisenmann et al. |
| 5,918,616 A | | 7/1999 | Sanfilippo et al. |
| 5,944,048 A | | 8/1999 | Bump et al. |
| 5,970,801 A | | 10/1999 | Ciobanu et al. |
| 5,975,126 A | | 11/1999 | Bump et al. |
| 5,988,211 A | | 11/1999 | Cornell |
| 6,026,847 A | * | 2/2000 | Reinicke et al. ......... 137/487.5 |
| 6,080,219 A | | 6/2000 | Jha et al. |
| 6,119,710 A | | 9/2000 | Brown |
| 6,152,162 A | | 11/2000 | Balazy et al. |

OTHER PUBLICATIONS

Mott Industrial, Porous metal flow restrictors. High strength. Wear resistant. Clog Free. Jun. 1997.

Mott Industrial, Mott Precision Porous Metal Flow Restrictors, Engineering and Product Guide, Mar. 1997.

Mott High Purity, Porous Metal Flow Restrictors, Jun. 1996.

Redwood Microsystems, Flow–istor Specifications, 1996.

Redwood Microsystems, report.html@me210abc.standford.edu, Spring, Oct. 2, 1997.

R&D Magazine, Sep. 1997, "Back to Basics—Vacuum Technology", p. 81.

Semiconductor International, "Innovative Gas Handling Technology" (Undated).

Cobb, Jr. James Stanley and Stutler, Stephen Charles, Defensive Publication for Variable Flow Restricting Apparatus, 857 O.G. 1039, published Dec. 24, 1968.

Gallant, John, "Sensors offer fast response times," Electrical Design News 34 (1989) May 25, No. 11, pp. 55–67.

* cited by examiner

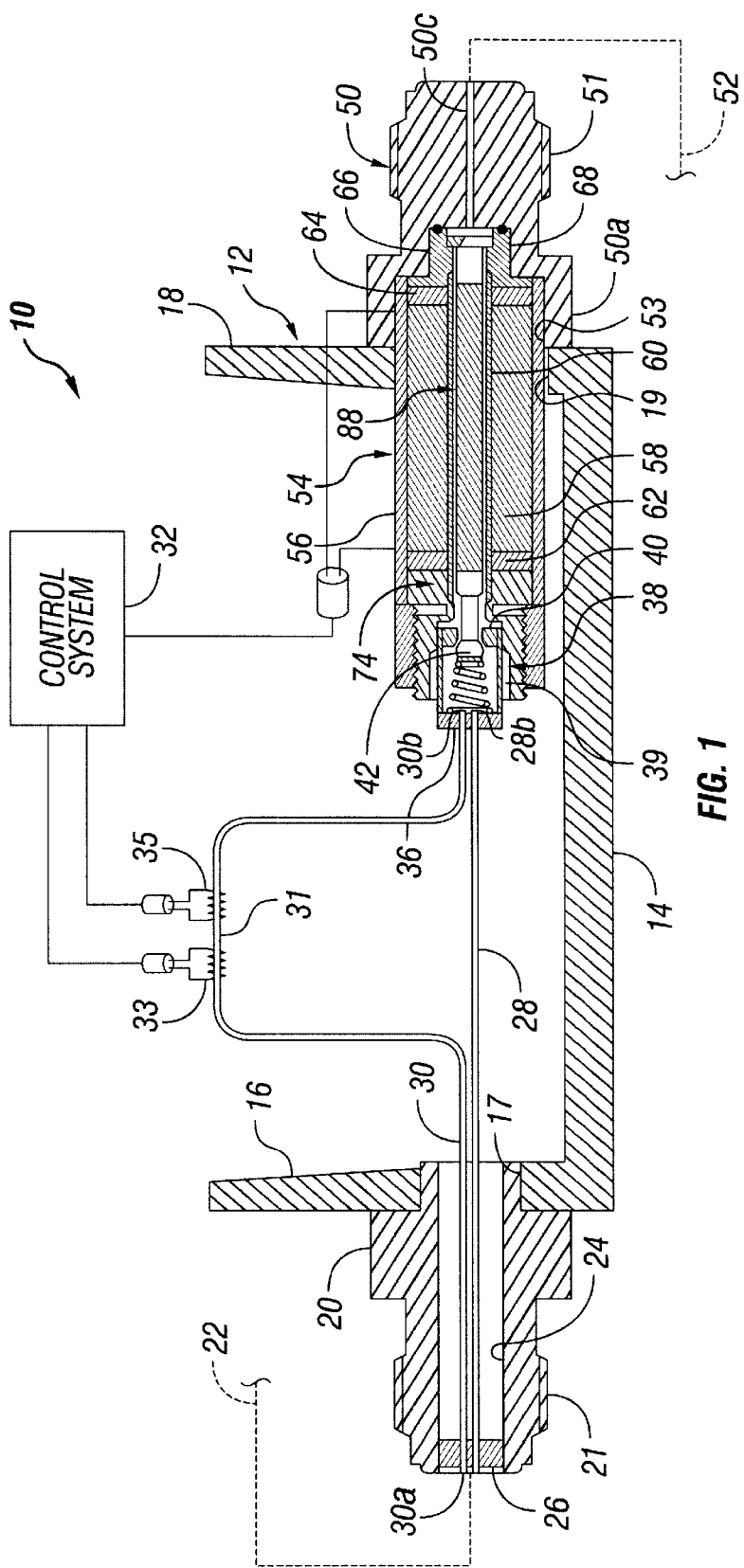
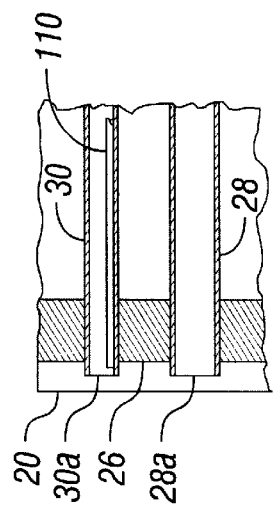
FIG. 1
FIG. 1A

SMALL INTERNAL VOLUME FLUID MASS FLOW CONTROL APPARATUS

CROSS REFERENCE TO RELATED APPLICATION

This application claims the priority of provisional application Serial No. 60/220,558 filed Jul. 25, 2000.

BACKGROUND

Flow control of gases used in the fabrication of semiconductors and similar manufacturing processes is critical to providing quality products. In semiconductor manufacturing, for example, certain gases directly influence the chemical and physical processes that deposit material on or etch material off of a semiconductor wafer. As the semiconductor industry continues to miniaturize semiconductor devices, the demand for accurate flow control of gases used in semiconductor manufacturing processes has become even more critical. Shorter manufacturing process times and smaller quantities and flow rates of gas. are being required. The demand for more accurate process gas flow control is aggravated by conditions such as fluctuating pressures in gas supply manifolds and conduits, requirements to control very low gas flow rates and the requirements to reduce or eliminate so-called "burst flows" which occur when valves in the gas supply conduit flow paths are opened suddenly to release pressurized gas to the process chambers.

Accordingly, there has been a need to improve fluid mass flow control apparatus used for control of process gas in semiconductor manufacturing, in particular. In this regard, there has been a need to develop fluid mass flow control apparatus wherein the fluid volume in the apparatus is minimized in order to accurately control the flow of relatively small quantities of gas and to minimize the requirements to purge moisture and previously controlled gases from the apparatus when a change in the type of gas being controlled is undertaken. By shrinking the so-called accumulation volume within the mass flow control apparatus, false flow signals to the apparatus control system are reduced and perturbations in the fluid flow output of the apparatus are also reduced. For example, with certain prior art mass flow control apparatus, minor changes in pressures in common gas supply manifolds supplying one or more mass flow controllers can affect closure of the flow control valves of one or more of the controllers wherein the controller(s) can only regain correct flow control after an elapsed time on the order of one to four seconds. Considering that some semiconductor manufacturing processes last only a total of five seconds, such lengthy recovery times for the flow control apparatus can significantly affect the associated process.

Prior art mass flow controllers are, for example, subject to reading and reacting on so-called false flow signals. A change of fluid pressure in the so-called accumulation volume of the controller between the section of the controller which includes the flow measuring sensor and flow restrictor and the flow control valve may be caused by additional fluid mass entering or exiting the accumulation volume. A majority of such fluid mass enters or exits the accumulation volume through the flow measuring section due to the relatively low resistance to flow through that section of the controller compared to flow resistance through the flow control valve seat. Accordingly, a change in the supply pressure to the mass flow controller or a change in the flow rate through the mass flow controller will result in a change in the quantity of fluid mass being measured and flowing through the mass flow controller's measuring section. However, a major portion of this flow does not pass through the flow control valve and out of the controller but, since the function of the mass flow controller is to indicate and control the flow out of the controller, these measured flows resulting from pressure increases or decreases are considered false or erroneous. Consequently, the control system for the mass flow controller, utilizing false flow information, responds by improperly positioning the flow control valve resulting in an improper flow through the flow control valve and out of the controller until the transient pressure change has expired. The relative size of an anticipated error in flow output can be significant when flow rates are relatively low such as, for example, about 100 SCCM (standard cubic centimeters per minute). Moreover, in some process applications, fluid mass flow control apparatus are required to operate with full scale flow ratings as low as 1.0 SCCM.

In addition to the flow control problems in mass fluid flow control apparatus associated with low fluid flow rates, so-called dry-down performance deteriorates at lower flow rate requirements. Dry-down performance refers to the time required for moisture to be purged from the surfaces of the fluid mass flow control apparatus exposed to the process gases being controlled. Of course, the moisture content and velocity of gas flowing over wetted surfaces influences the rate at which moisture is removed therefrom. Flow path geometry, cross-sectional flow area and surface area are important parameters to be considered when trying to maximize the ability to remove moisture and purge unwanted gases from the flow passages of fluid mass flow control apparatus.

As mentioned above, the reduction or elimination of so-called burst flow is increasingly being required in certain fluid mass flow control apparatus applications where, for example, an isolation valve is located in the fluid flow path downstream of the mass flow controller. Fluid mass flow control apparatus typically do not have positive full flow shutoff capability but may limit flow to a fraction of one percent of the full flow capability of the apparatus. The pulse flow of gas associated with the pressurized volume of gas within the apparatus and the opening of the isolation valve means a loss of flow control. Conversely, in arrangements where the isolation valve is disposed upstream of the mass flow controller, it is desirable, in many instances, to maintain a zero flow set point command to the mass flow control apparatus and open the isolation valve a short period of time before changing the flow command. In this way the controller will perform in a more controlled manner so that, once the transient supply pressure conditions associated with opening the isolation valve have expired, the mass flow controller operating set point can be changed.

In light of the performance problems discussed hereinabove and further hereinbelow, it becomes apparent that reducing the internal volume and surface area of fluid mass flow control apparatus is necessary to meet increasingly stringent performance requirements. It is to these ends that the present invention has been developed.

SUMMARY OF THE INVENTION

The present invention provides an improved fluid mass flow control apparatus, particularly of a type required for controlling relatively small fluid mass flow rates, including, for example, fluid mass flow rates required in production processes for semiconductor devices. The present invention also provides an improved fluid mass flow control apparatus having a small internal volume, a unique flow passage arrangement, an improved actuator for actuating a flow control valve, an improved flow control valve arrangement and an improved arrangement for adjusting the apparatus to set the full flow control range of the apparatus.

In accordance with one aspect of the invention, a fluid mass flow control apparatus is provided which includes two parallel flow passages constructed from relatively small diameter tubing sections. One of the flow passages provides for routing part of the flow through a mass flow sensor and the other of the passages is configured such as to serve as a flow restrictor. By utilizing smaller flow passages higher pressure drops therethrough at moderate to high flow rates can be tolerated without compromising performance. Moreover, the smaller diameter flow passages and a simplified flow restrictor provide improved apparatus performance while retaining low fluid pressure drops through the controller at low fluid flow rates. An adjustment may be made by inserting a wire or tube of smaller diameter into the tube which leads to and includes the flow sensor. By changing the diameter and the length of the inserted wire or tube, the flow restriction of the sensor tube can be adjusted to achieve the desired flow range.

The present invention also provides an improved fluid mass flow control apparatus which utilizes a flow control valve capsule in which a valve closure member and valve seat is assembled. The valve closure member may, if desired, be spring biased to its closed position. The so-called valve capsule is also configured to cooperate with an improved valve actuator.

Still further, the invention contemplates the provision of a valve actuator for a fluid mass flow control apparatus which is disposed in and partially defines the fluid flowpath, is capable of withstanding exposure to corrosive fluids and is disposed in a position to provide a more efficient and simplified mechanical design. A magnetostrictive actuator, in particular, may be used to move the valve closure member. A magnetostrictive actuator is preferred considering manufacturing costs, simplicity and reliability of design and resistance to damage from corrosive fluids.

In accordance with a still further aspect of the present invention, a fluid mass flow control apparatus is provided which includes small internal fluid volume to minimize control perturbations, to improve fluid purging and so-called dry-down performance and to generally improve the control of relatively small volumes of fluids, particularly gases used in semiconductor manufacturing processes.

Those skilled in the art will further appreciate the above-mentioned advantages and superior features of the invention together with other important aspects thereof upon reading the detailed description which follows in conjunction with the drawings.

BRIEF DESCRIPTION OF THE SEVERAL VIEWS OF THE DRAWINGS

FIG. 1 is a longitudinal central section view of a fluid mass flow control apparatus in accordance with the invention;

FIG. 1A is a detail view on a larger scale showing the inlet ends of the parallel flow tubes;

DETAILED DESCRIPTION OF A PREFERRED EMBODIMENT

Figure 2:
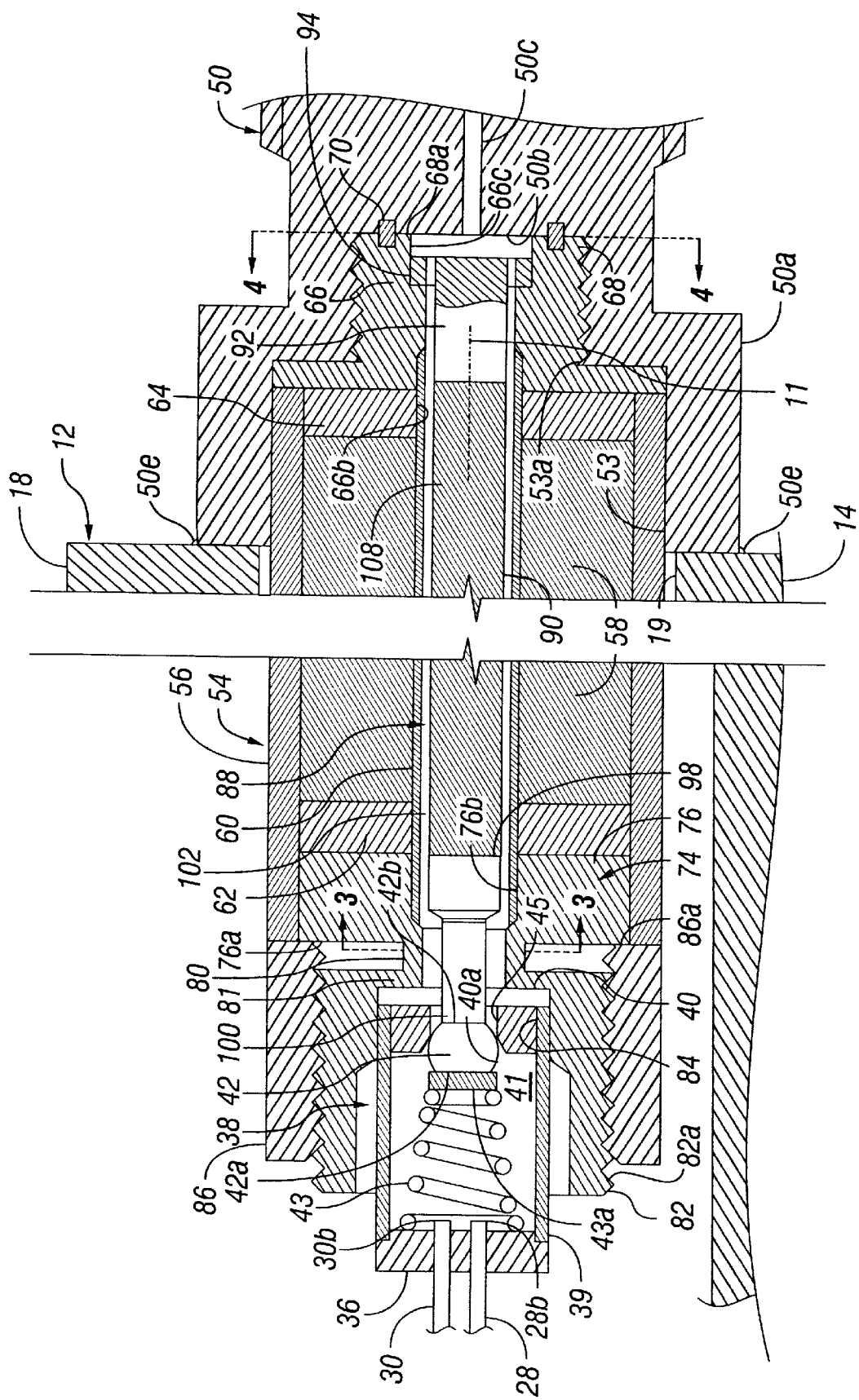
FIG. 2 is a view of a portion of the apparatus as shown in FIG. 1 on a larger scale.

In the description which follows, like elements are marked throughout the specification and drawing with the same reference numerals, respectively. The drawing figures are not necessarily to scale and certain features may be shown in somewhat schematic or generalized form in the interest of clarity and conciseness.

Referring to FIG. 1, there is illustrated a unique fluid mass flow control apparatus in accordance with the invention and generally designated by the numeral 10. The apparatus 10 comprises a frame 12 including a base portion 14 and spaced apart upstanding legs 16 and 18. The frame 12 may be formed from a section of conventional C-channel member, for example. The leg 16 is adapted to include a bore 17 coaxially aligned with a corresponding bore 19 in the leg 18. Bore 17 is adapted to receive a coupling member 20 suitably secured to leg 16 and adapted to be connected to a fluid supply conduit 22 which, in turn, is connected to a source of one or more process gases, not shown. Coupling member 20 includes external threads 21 and an elongated central passage 24 formed therein and receiving a cylindrical collar 26 at one end thereof, as illustrated. Collar 26 is operable to support spaced apart elongated, relatively small diameter metal tubes 28 and 30, respectively, which extend substantially parallel to each other from the collar 26 partway toward the leg 18. The tubes 28 and 30 may be suitably secured to the collar 26 by electron beam or laser welding or suitable brazing methods. Similarly, the collar 26 may be joined to the coupling 20 by such a process. Tubes 28 and 30 may be formed of conventional stainless steel, so-called hypodermic gage tubing, for example.

Tube 30 is operable to conduct fluids, such as semiconductor manufacturing process gases, through a laterally displaced tube section 31 which includes spaced apart electric wire coils 33 and 35 disposed therearound. Tube 30, 31 and coils 33 and 35 form a thermal type fluid mass flow sensor. The electrical conductor wire coils 33 and 35 are suitably connected to a control system 32 for the mass flow control apparatus 10. The thermal mass flow sensor formed by the tube 30, 31 and the coils 33, 35 may be of a type disclosed in my U.S. Pat. No. 5,660,207, issued Aug. 26, 1997. Further explanation herein of the flow sensor described above is not believed to be necessary to practice the present invention.

Accordingly, the fluid flow conducting tubes 28 and 30 include inlet ends 28a and 30a supported in the collar 26 while the tubes have outlet ends 28b and 30b supported in a second generally cylindrical collar 36 spaced from the collar 26 and forming part of a generally cylindrical flow control valve capsule or housing 38. Tubes 28 and 30 extend through suitable bores in collar 36 and are secured thereto by gas-tight welds or brazing. The capsule 38 further comprises a generally cylindrical thin-walled tube 39 into which a cylindrical valve seat member 40 is press fitted, see FIG. 2 also. Seat 40 is preferably formed of sapphire or a similar material. The tube 39 and collar 36 may be assembled by brazing the elements together in the configuration illustrated in FIGS. 1 and 2 to form a gas-tight internal chamber 41. A movable closure member 42 is disposed in the chamber 41 and may be biased to a valve closed position in engagement with a seat surface 40a of valve seat 40 by a conical coil spring 43, FIG. 2. Accordingly, closure member 42, which is preferably a spherical ball type member, is urged to a valve closed position to close off a passage 45 in the valve seat 40, FIG. 2. Coil spring 43 may include an end part 43*a* comprising a plate or disc-like member engaged with a flat surface 42*a* on closure member 42.

Referring further to FIGS. 1 and 2, the mass flow control apparatus 10 is further characterized by a generally cylindrical externally threaded coupling member 50 supported on frame 12 and having external threads 51 formed thereon, FIG. 1, for connection to a fluid discharge conduit 52, not shown in detail in FIGS. 1 or 2. Coupling member 50 preferably includes an enlarged diameter portion 50*a* having a stepped bore 53, 53*a* formed therein, FIG. 2, for at least partially supporting a valve actuator, generally designated by the numeral 54. The valve actuator 54 is preferably of the magnetostrictive type and is characterized by an outer generally cylindrical tubular housing member 56 suitably connected to an end cap member 66 and including a portion disposed in coupling member bore 53, FIGS. 1 and 2. Housing member 56 extends through bore 19, as shown and actuator 54 and coupling 50 may be secured to frame 12 by spot welds 50*e*, FIG. 2. A wire coil 58 is disposed in the housing member 56 and is preferably also wound around an elongated, inner, fluid conducting flow tube 60 which is preferably coaxial with housing member 56. Spaced apart generally cylindrical disk members 62 and 64 which, along with the housing member 56, are formed of magnetic material, define the end portions of an actuator coil space formed therebetween. A cylindrical end cap member 66 includes a reduced diameter portion 68 which is preferably threaddedly engaged with member 50 at reduced diameter bore part 53*a*, FIG. 2. A suitable corrosion resistant metal seal ring 70 is interposed an end face 68*a* of end cap member 66 and a transverse wall 50*b* of coupling member 50. A central elongated flow passage 50*c* extends through coupling member 50, opens through the wall 50*b* and is in fluid flow communication with conduit 52.

Referring further to FIG. 2, the opposite end of actuator 54 includes a generally cylindrical end member 74 including a first enlarged diameter part 76, FIG. 2, suitably disposed in and secured to the tubular housing member 56. Member 74 includes a substantially reduced diameter tubular part 80, see FIG. 3 also, which is joined to an enlarged diameter externally threaded end part 82, FIG. 2, having a suitable bore 84 formed therein for receiving the valve capsule 38 in gas tight fitting relationship to member 74. End part 82 is provided with external threads 82*a* which are threaddedly engaged with a rotatable internally threaded nut 86 having an end face 86*a* engageable with a transverse end face 76*a* of member 74. Rotation of the nut 86 will elastically or plastically elongate the reduced diameter part 80 and deflect a circumferential wall part 81 of member 74 to displace the end part 82, the valve capsule 38 and closure member 42 with respect to an elongated actuator member 88 disposed within the flow tube 60. As shown in FIG. 2, flow tube 60 extends within a portion of a stepped bore 66*b* in member 66 at one end and within a bore 76*b* formed within member 74 at its opposite end. Flow tube 60 is secured in fluid tight sealed relationship with members 66 and 74 within bores 66*b* and 76*b* by brazing or the like.

Figure 4:
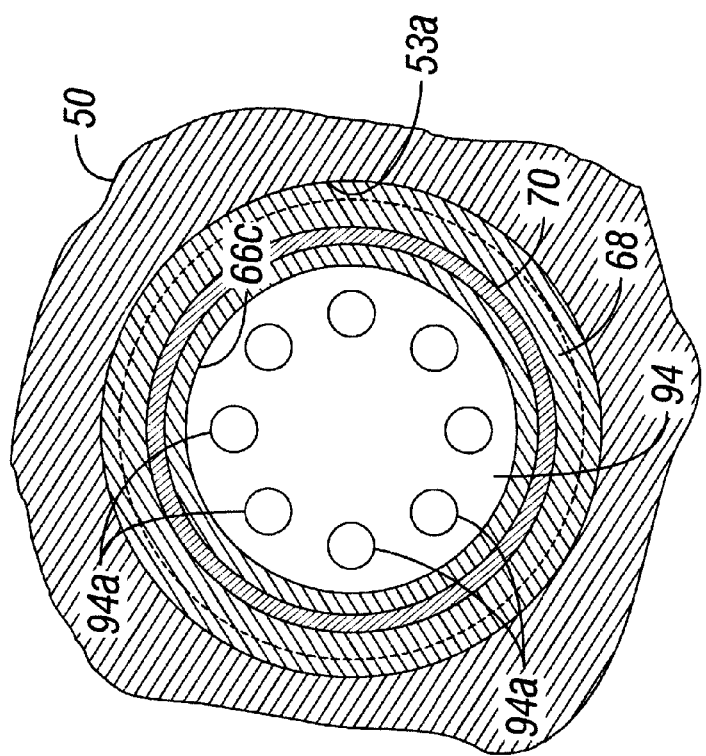
FIG. 4 is a detail section view taken generally along the line 4—4 of FIG. 2.
Figure 3:
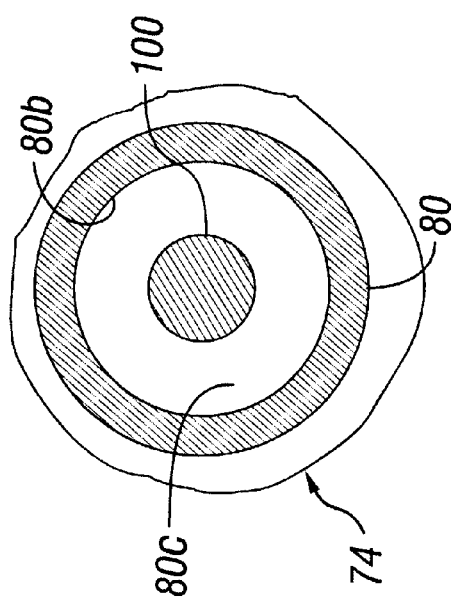
FIG. 3 is a detail section view taken generally along the line 3—3 of FIG. 2.

Referring further to FIGS. 2, 3 and 4, actuator member 88 includes an elongated thin-walled cylindrical tube 90, FIG. 2, which is tightly connected at one end to a generally cylindrical plug member 92 having a cylindrical flange 94 formed thereon. Flange 94 is disposed in press fitted relationship in a bore 66*c* formed in end cap member 66, see FIG. 4 also. Flange 94 includes a plurality of flow ports 94*a*, FIG. 4, formed therein and arranged in a generally circular pattern, as shown in FIG. 4. The opposite end of actuator tube 90 is closed by another plug member 98 which includes an elongated generally cylindrical actuator rod part 100 extending coaxially therefrom and engageable with valve closure member 42, FIG. 2, preferably at a flat surface 42*b* formed thereon. Actuator rod part 100 is preferably disposed in a bore 80*b* formed in tubular part 80 of member 74, see FIG. 3, to form an annular flow passage 80*c* extending between bore 84 and an annular flow passage 102 formed between flow tube 60 and actuator member 88. Accordingly, when closure member 42 is unseated, fluid may flow from chamber 41 through passage 45, passages 80*c* and 102 and through ports 94*a* into discharge passage 50*c* formed in coupling member 50. The above-described arrangement of elements which provide the flow path through apparatus 10 provides for minimum internal volume of the apparatus, avoids large diameter bores or diaphragm elements required for solenoid and piezoelectric actuators, respectively, and provides minimal gas tight joints between the components of the apparatus.

Magnetostrictive actuator member 88 is further characterized by a quantity of magnetostrictive material 108 disposed within actuator tube 90 between end plug members 92 and 98. A suitable magnetostrictive material may be that sold by Etrema Products, Inc. of Ames, Iowa as their type Terfenol-D magnetostrictive material, which material is an alloy including iron, terbium and dysprosium. Such material will elongate along central axis 11 of actuator member 88 and apparatus 10, FIG. 2. Accordingly, in response to imposition of a magnetic field on the actuator member 88 as produced by the actuator coil 58, the actuator member 88 will elongate or contract to effect movement of the closure member 42 with respect to the valve seat surface 40*a* to control flow of fluid from chamber 41 through the apparatus 10 to conduit 52. The efficiency of the magnetic field generated by the coil 58 is enhanced by forming the housing member 56 and the end members 62 and 64, in particular, of magnetic material. The actuator 54 is particularly advantageous in that it offers very rapid, microsecond, response time, high force generation and low input voltages to the coil 58 while also being capable of operating in a high temperature environment. Although piezoelectric actuator devices are capable of greater elongation, as are solenoid type devices, magnetostrictive actuators are orders of magnitude faster than solenoid type actuators. Moreover, the magnetostrictive actuator 54 does not require the high voltage excitation necessary for piezoelectric devices nor is it limited to operating at temperatures below 100° Celsius. In this regard also, the actuator 54 provides a small diameter high ampere turns coil arrangement which requires substantially reduced power to effect operation of the actuator to control the position of closure member 42.

Moreover, by fabricating the actuator tube 90 and the end plugs 92 and 98 of suitable corrosion-resistant materials, brazing the plugs 92 and 98 to the tube 90 at opposite ends thereof and by preloading the magnetostrictive material 108 to a compressive stress of about 1000 psi to 8000 psi, an elongated long-life actuator member 88 is provided. The tube 90 and the end plugs 92 and 98 may be fabricated of material such as 316 L stainless steel or Hastelloy Alloy No. C22 or C276, for example. Again, the operation of the actuator member 88 is such that when the magnetostrictive material 108 is subjected to a magnetic field, it will elongate to elastically stretch the tube 90 and effect controlled movement of the closure member 42 with respect to the seat surface 40*a*.

When the tube 90 is stretched, it will generate a compressive force on the encased column of material 108 and the wall thickness of the tube 90 should be maintained at minimum practical dimensions such as a thickness of about 0.002 inches. Small diameter tubing of such reduced wall thickness is available from K Tube Corporation of San Diego, Calif. The ratio of the relative stiffness of the tube 90, acting as a column, to the stiffness of the magnetostrictive material 108 will determine the reduction in stroke that the composite column exhibits compared to the stroke of a non-encased column. For control of smaller fluid flow rates where less stroke is desired, a thicker tube wall can be selected for the tube 90 to appropriately reduce the stroke of the actuator member 88.

After the actuator 54 is assembled, final adjustments may be made to the position of the closure member 42 with respect to the actuator rod part 100 by rotation of the nut 86 to displace end part 82 and, to some extent, the reduced diameter tubular part 80 of member 74. Initially, the actuator member 88 is inserted into the tube 60 until the end plug 92 is received in the bore 66c and flange 94 is preferably press fitted into position in the bore. The actuator member 88 may not require to be centered in the bore of flow tube 60 and rod part 100 may rest on valve seat 40 at bore wall of passage 45 and in low friction sliding engagement with such bore wall. Typically, the flange 94 is pressed completely into the bore 66c. Then, a final adjustment of the position of the closure member 42 with respect to the distal end of the actuator rod 100 may be made by adjustment of the nut 86 to axially move capsule 38 as described above.

The construction and basic operation of the mass flow control apparatus 10 is believed to be within the purview of one skilled in the art based on the foregoing description read in conjunction with the drawings. A further advantage of the mass flow control apparatus 10 pertains to the adjustments which may be made to fluid flow through the tube 30 with respect to flow through the tube 28 to change the full scale range of fluid flow which may be controlled by the apparatus. For example, prior art fluid mass flow control devices have been developed which change the so-called split ratio, that is, the ratio of fluid mass flow through the sensor with respect to the fluid mass flow through the main flow path, by changing the flow resistance of a flow restrictor interposed in tube 28, for example, or the counterpart flow passage thereof while leaving the flow restriction of the sensor flow path, such as represented by tube 30, unchanged. This results in the requirement for use of multiple and somewhat larger and more complex, so-called laminar flow elements (LFEs) or flow restrictors interposed in the main fluid flow path. The apparatus 10 is operable to adjust the flow restriction of the sensor portion of the apparatus in a manner that retains the benefits of low fluid pressure loss for operation at low fluid flow rates while allowing for higher pressure drops at intermediate flow rates. The fluid mass flow control apparatus 10 also provides for adjusting the flow restriction of the sensor flow path formed by the tube 30 in a manner that retains the beneficial low pressure drop across the mass flow sensor and flow restrictor or LFE for operating at low flow rates. However, the configuration of the apparatus 10 also allows for higher fluid flow pressure drops at intermediate and high flow rates when pressure drop is not critical to thereby allow for smaller, simpler and fewer laminar flow elements to be used in conjunction with the apparatus.

For example, the physical dimensions governing the operation of a mass flow sensor make it advantageous to use as small a tube diameter as practical. The smallest sensor tube used on current commercially available fluid mass flow controllers is about 0.010 inches internal or inside diameter. The maximum allowable flow that provides for socalled linear operation is determined by the heat transfer limitations and is typically about 3.0 to 8.0 SCCM of nitrogen resulting in a pressure drop less than about 3.0 inches water at standard temperature and pressures. This pressure drop, an indirect byproduct of the sensor heat transfer mechanism, has been used as the default design target for laminar flow elements used in parallel with the flow sensor portion of the apparatus. Accordingly, the same sensor tube geometry, if used solely as a laminar flow element, can flow about 100 SCCM of nitrogen with acceptable linearity but requires a markedly higher pressure drop for the higher flow rates.

By adjusting the flow restriction characteristics of the tube 30, the low internal volume mass flow control apparatus 10 can utilize a simplified flow restrictor without loss of performance at low flow rates. Accordingly, flow restriction adjustment may be made by inserting an elongated wire or tube 110, FIG. 1, within the tube 30 and by changing the diameter and the length of the wire 110, the flow restriction of the sensor tube 30 can be adjusted to achieve the desired full-scale flow range capability of the apparatus 10.

Moreover, those skilled in the art will recognize that the construction of the mass flow controller for fluid flow control in accordance with the invention may be adapted for use with so-called isolation valves of the type mentioned hereinabove. The small diameter tubing flow path construction of the mass flow controller 10 may be adapted for an isolation valve so that such valves would reduce the so-called burst flow conditions described hereinabove in operation of such isolation valves.

Although a preferred embodiment of the apparatus of the present invention has been described in detail herein, those skilled in the art will recognize that various substitutions and modifications may be made without departing from the scope and spirit of the appended claims.

What is claimed is:

1. A fluid mass flow control apparatus for controlling relatively low flow rates of fluid in a process, comprising:

a first elongated flow tube having an inlet end and a discharge end;

a second elongated flow tube having an inlet end and a discharge end;

a valve capsule housing including a chamber formed therein;

said first and second flow tubes being connected at their inlet ends to a source of pressure fluid and said first and second flow tubes being connected at their discharge ends to said capsule housing;

a valve closure member disposed in said capsule housing and engageable with a valve seat;

a conduit member forming an elongated flow passage in fluid flow communication with said capsule housing and with a discharge coupling member of sad apparatus;

an actuator including an actuator member operably engageable with said closure member to move said closure member relative to said valve seat to control flow of fluid through said apparatus; and a magnetic coil disposed in proximity to said actuator member for causing said actuator member to effect movement of said closure member;

wherein said actuator member includes an elongated elastically deflectable actuator tube containing magnetostrictive material; and wherein said capsule housing is supported by an elongatable member operable to move said capsule housing and said closure member with respect to said actuator member.

2. The flow control apparatus set forth in claim 1 wherein:
said actuator member is disposed in said flow passage.

3. The flow control apparatus set forth in claim 1 wherein:
said actuator member includes magnetostrictive material and said magnetic coil is operable to impose a magnetic field on said actuator member to effect elongation and contraction thereof to control movement of said closure member.

4. The flow control apparatus set forth in claim 1 wherein:
said capsule housing is mounted for movement with respect to said actuator member to adjust engagement of said actuator member with said closure member.

5. The flow control apparatus set forth in claim 1 including:
a member operably engageable with said elongatable member for adjusting elongation thereof to adjust the position of said closure member.

6. The flow control apparatus set forth in claim 1 wherein:
said actuator member comprises an elongated actuator tube, a first plug inserted in one end of said actuator tube and a second plug inserted in an opposite end of said actuator tube and said actuator tube contains a quantity of magnetostrictive material therein between said plugs.

7. The flow control apparatus set forth in claim 6 including:
an electromagnetic coil disposed about said actuator member for energizing said actuator member to effect controlled elongation and contraction of said actuator member.

8. The flow control apparatus set forth in claim 1 wherein:
one of said first and second flow tubes is operably associated with a flow sensor for determining the mass flow rate through said apparatus.

9. The flow control apparatus set forth in claim 8 wherein:
said flow sensor comprises a thermal mass flow sensor including a first coil operably connected to said one flow tube and a second coil operably connected to said one flow tube and spaced from said first coil for sensing mass flow of fluid through said one flow tube.

10. The flow control apparatus set forth in claim 8 including:
a control system operably connected to said flow sensor and to said actuator for controlling the mass flow of fluid through said flow control apparatus.

11. The flow control apparatus set forth in claim 1 including:
a flow restrictor insertable in one of said flow tubes.

12. The flow control apparatus set forth in claim 11 wherein:
said flow restrictor comprises one of an elongated rod and tube of one of a preselected length and diameter insertable in said one flow tube.

13. The flow control apparatus set forth in claim 1 wherein:
said closure member is biased to a valve closed position by spring means supported by said capsule housing.

14. A fluid mass flow control apparatus comprising:
a control valve housing including a chamber formed therein;
a closure member disposed in said chamber;
an inlet to said chamber for introducing fluid to be controlled by said apparatus;
a conduit operably connected to said valve housing for receiving fluid discharged therefrom;
a valve actuator disposed in said conduit and including an actuator member operably engageable with said closure member for moving said closure member to control the flow of fluid through said apparatus, at least a part of said actuator member forming, with said conduit, an annular flow path in said apparatus; and
a member forming a discharge passage in fluid flow communication with said conduit for conducting fluid flow controlled by said apparatus to a process;
wherein said valve housing is supported by an elongatable member operable to move said valve housing and said closure member with respect to said actuator member.

15. The flow control apparatus set forth in claim 14 wherein:
said actuator member includes a magnetostrictive material responsive to a magnetic field to effect movement of said closure member.

16. The apparatus set forth in claim 8 including:
a magnetic field generator disposed about said conduit for generating a magnetic field to effect elongation and contraction of said actuator member.

17. The apparatus set forth in claim 14 wherein:
said actuator comprises an elongated elastically stretchable tube, opposed members closing opposite ends of said tube, respectively, and a quantity of magnetostrictive material disposed in said tube and responsive to a magnetic field imposed on said tube to effect one of elongation and contraction of said tube.

18. The apparatus set forth in claim 14 wherein:
said valve housing is mounted for movement with respect to said actuator to adjust engagement of said actuator member with said closure member.

19. The flow control apparatus set forth in claim 14 including:
a threaded member operably engaged with said elongatable member for adjusting the elongation thereof to adjust the position of said closure member with respect to said actuator member.

20. The flow control apparatus set forth in claim 14 including:
a flow sensor connected to said valve housing for conducting at least a portion of fluid flow to said chamber and for sensing a mass rate of fluid flow through said apparatus.

21. The flow control apparatus set forth in claim 20 wherein:
said flow sensor is associated with a first fluid flow conducting tube connected to said valve housing and said apparatus includes a second fluid flow conducting tube connected to said valve housing, said flow conducting tubes being operable to conduct fluid flow through said apparatus.

* * * * *